United States Patent [19]

Blackstone

[11] 4,160,472
[45] Jul. 10, 1979

[54] APPARATUS FOR SPLITTING WOOD

[75] Inventor: George H. Blackstone, Toledo, Ohio

[73] Assignee: Arnold Industries, Inc., Toledo, Ohio

[21] Appl. No.: 818,389

[22] Filed: Jul. 25, 1977

[51] Int. Cl.² .......................... B27L 7/00; F16H 37/00
[52] U.S. Cl. .............................. 144/194; 180/53 WA; 403/336
[58] Field of Search ............... 144/193 R, 193 D, 194; 254/104; 403/335, 336, 337, 338; 180/53 WA, 53 R, 53 FE

[56] References Cited

U.S. PATENT DOCUMENTS

| 3,500,660 | 3/1970 | Anderson | 403/336 X |
| 3,993,113 | 11/1976 | Thackery | 144/193 X |
| 4,026,337 | 5/1977 | Thackery | 144/193 R |

FOREIGN PATENT DOCUMENTS 977823  11/1950  France .................................... 403/336

OTHER PUBLICATIONS

Chain Saw Industry & Power Equipment Dealer; Oct. 1976, p. 32 (The Stickler).

Primary Examiner—Robert Louis Spruill
Assistant Examiner—W. D. Bray
Attorney, Agent, or Firm—Allen D. Gutchess, Jr.

[57] ABSTRACT

Apparatus is provided for splitting wood and specifically logs. The apparatus includes a conical splitting device which is attached to a vehicle wheel hub and is rotated as the wheel is driven. A separate mounting plate attaches the splitting device to the wheel hub which enables one splitting device to be mounted on a variety of vehicle wheel hubs by the use of a variety of mounting plates. The splitting device itself has a spirally-grooved cone with a truncated conical portion behind the cone to prevent the possibility of logs riding up the device and damaging the wheel hub or adjacent portions of the vehicle.

9 Claims, 3 Drawing Figures

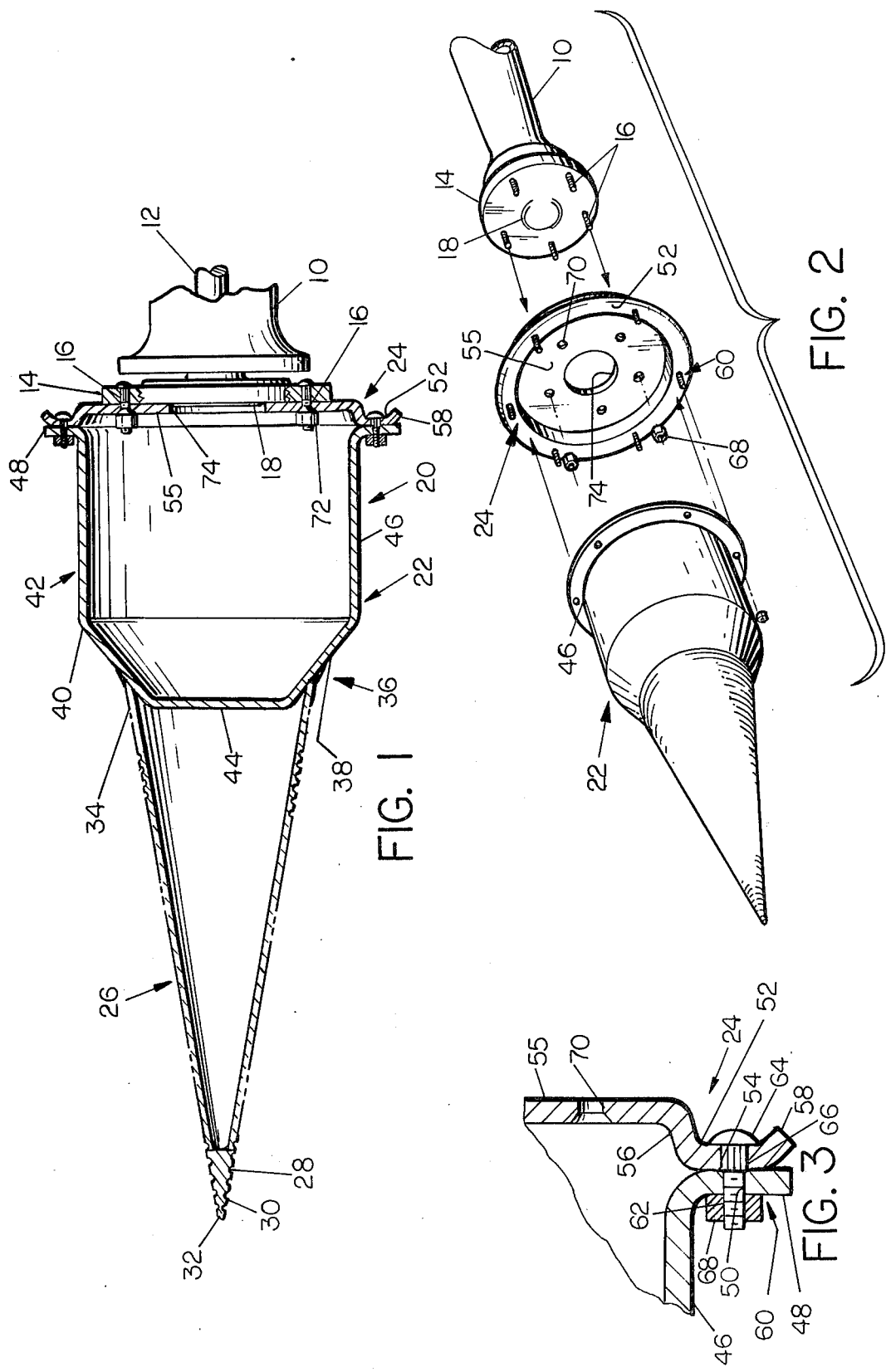

APPARATUS FOR SPLITTING WOOD

This invention relates to apparatus for splitting wood and more specifically to such apparatus which is designed to be mounted on and driven by a vehicle wheel hub.

Wood splitters of the type under consideration are becoming widely accepted for splitting logs. Such splitters are relatively inexpensive, particularly as compared to hydraulic splitters now on the market, and are also capable of rapidly splitting logs. A splitter of this type is shown in U.S. Pat. No. 3,993,113, for example. It includes a conical splitter member which is mounted on a powered wheel hub of a vehicle after it is jacked up and supported above the ground. The engine is then placed in gear and operated at a fast idle to rotate the splitter. Logs are then hand fed onto the tip of the splitter with a spiral groove thereon causing the logs to feed onto the cone and split as they ride up on it.

Heretofore, a large inventory of a variety of splitters had to be carried in stock by dealers in order to accommodate the various wheel hubs of the various vehicles with which the splitters might be used. Also, with the splitters heretofore known, it was possible for a log to ride completely up the conical member to the wheel hub of the vehicle, causing damage to the hub or adjacent portions of the vehicle, such as a fender.

The present invention provides improved apparatus for splitting wood which overcomes the above disadvantages. The new splitting apparatus includes a splitter with a large diameter base having connecting means thereon. Rather than the base being bolted directly to the wheel hub, a separate mounting plate is provided which has connecting means positioned around the periphery thereof to be aligned with the connecting means of the base of the splitter. The mounting plate also has an inner series of stud holes by means of which the mounting plate can be attached to studs of the wheel hub. Rather than having a large inventory of a wide variety of relatively expensive splitters, a dealer need carry only one style splitter with a variety of relatively inexpensive mounting plates to enable the splitter to be accommodated on a wide variety of vehicle wheel hubs and even such vehicles as garden tillers and garden tractors.

In addition, the wood splitter according to the invention has a truncated conical portion between a spirally-grooved cone and the large diameter base which assures the splitting of any wood carried up that far on the grooved cone. Thus, the truncated conical portion prevents any partially split logs from reaching the wheel hub of the vehicle and causing damage thereto.

It is, therefore, a principal object of the invention to provide an improved wood splitter assembly for splitting logs and the like.

Another object of the invention is to provide a wood splitter assembly embodying one wood splitter design with a plurality of different mounting plates to enable the wood splitter to be mounted on a wide variety of vehicle wheel hubs.

A further object of the invention is to provide a wood splitter having a grooved conical portion, a large cylindrical base, and a truncated conical portion therebetween to assure the splitting of logs prior to reaching a vehicle wheel hub on which the splitter is mounted.

Many other objects and advantages of the invention will be apparent from the following detailed description of a preferred embodiment thereof, reference being made to the accompanying drawings, in which:

FIG. 1 is a view in longitudinal cross section of a wood splitter assembly according to the invention mounted on a wheel hub;

FIG. 2 is an exploded view in perspective of the splitter assembly and hub of FIG. 1; and FIG. 3 is an enlarged, detailed view in cross section of a portion of the assembly of FIG. 1.

Referring to FIG. 1, portions of a vehicle are shown, including an axle housing 10, a rear axle 12, and a wheel hub 14. A plurality of wheel studs 16 extend outwardly from the hub 14, perpendicular to the face thereof, and equally spaced in a circular pattern of a given diameter. Of course, various vehicles have different numbers and positions of the studs 16 with the studs themselves also being of different sizes. The hub also may have a projection thereon, such as a central protrusion 18, in this instance.

A wood splitter assembly according to the invention is indicated at 20 and basically includes a wood splitter 22 and a mounting plate or member 24. The wood splitter 22 includes a spirally-grooved cone 26 having a spiral groove 28 and a spiral ridge 30 extending from an outer tip 32 to an inner base edge 34. The tip 32 is not sharp, but, nevertheless, can easily bore into a log held thereagainst. Because the tip 32 receives the most wear, it is preferably made of a hardened alloy steel and welded to the rest of the cone. The splitter 22 also includes a truncated conical portion 36 having a smaller diameter outer end 38 at the base edge 34 of the cone 26 and a larger diameter inner end 40.

As a log rides along the cone 26, it is split apart by the increasing diameter of the cone. However, on occasion, soft or wet wood may not split fully and be carried up beyond the cone 26. With some splitters heretofore known, it has been possible for the log to be moved against the wheel hub or portions of the vehicle and cause damage. However, with the truncated conical portion 36 of the splitter 22, the partially split logs reaching the smaller diameter end 38 thereof will be fully split by the time they reach the larger diameter end 40 or, at least, will not be carried to the wheel hub or vehicle because there are no additional grooves on the splitter 22 beyond the cone 26 to cause such movement.

The truncated conical portion 36 is formed by a base 42 to which the cone 26 is welded at the base edge 34. The base 42 also includes an end wall 44 located near the base edge 34 to provide transverse strength for the splitter 22. The base 42 also has a cylindrical base wall 46 terminating at its end in connecting means and specifically an outwardly-extending, annular connecting flange 48. The flange 48 has a plurality, in this case six, bolt holes 50 equally spaced therearound.

The mounting plate or member 24 also has connecting means for providing a connection with the connecting means of the wood splitter 22. The connecting means include an outwardly-extending, annular connecting or mounting flange 52 also having six equally spaced openings 54 therein, in this instance. The flange 52 projects outwardly from a central, planar, circular portion 55 of the mounting plate 24 with a shoulder 56 therebetween. The annular shoulder 56 adds strength to the overall mounting plate along with an annular inwardly-extending lip 58 on the outer edge of the mounting flange 52 so that the plate can be made of thinner material than otherwise possible.

As shown, particularly in FIG. 3, bolts 60 are located in the openings 54. The bolts 60 have threaded shanks 62 extending outwardly from the flange 52 with heads 64 and serrated shank portions 66 between the threaded shanks 62 and the heads 64. The serrated shanks 66 are affixed in the mounting plate 24 by a press fit so that the bolts can be forced out and replaced in the event the threads of the shanks 62 should be damaged. When the mounting plate 24 is assembled with the base 42, the threaded shanks 62 of the bolts 60 extend through the openings 50 in the flange 48 and nuts 68 are turned on the shanks to securely assemble the mounting plate and the splitter.

The mounting plate 24 also has a plurality of stud holes 70 formed in the central planar portion 55 thereof and are spaced and positioned to be aligned with the studs 16, being on a circular pattern of the same diameter as the stud pattern. The mounting plate can then be assembled on the studs by nuts 72. The planar portion 55 of the mounting plate 24 also has a large central opening 74 therein to receive the central protrusion 18 of the wheel hub 14.

The number of the studs 16, their spacing, location, and size will vary from vehicle to vehicle. Consequently, the mounting plate 24 can be made in a number of designs with the number and position of the stud holes 70 and their diameters varying to accommodate various wheel hubs. Each of the mounting plates 24, however, will have the same bolt openings 54 so that the mounting plate 24 can accommodate the one splitter 22 regardless of the position and size of the stud holes 70 and the size of the central opening 74, if any. Further, one mounting plate can have two or even more series of the stud holes 70 so that the one mounting plate can accommodate two or more different wheel hubs. Even so, a number of different mounting plates must be provided to enable the splitter 22 to be employed with substantially all vehicles and including such vehicles as garden tillers and tractors. With this arrangement, however, only one design of the relatively expensive splitters need be produced and maintained in inventory along with a number of different relatively inexpensive mounting plates.

Various modifications of the above-described embodiment of the invention will be apparent to those skilled in the art, and it is to be understood that such modifications can be made without departing from the scope of the invention, if they are within the spirit and the tenor of the accompanying claims.

I claim:

1. A wood splitter comprising wall means forming a cone having a tip and a base edge, said cone tapering away from said base edge to said tip, said cone having at least one spiral groove extending substantially from said tip to said base edge, wall means forming a truncated conical portion having a small diameter outer edge substantially equal to the diameter of the base edge of said cone and affixed thereto and having a larger diameter inner edge, said truncated conical portion being formed with an included angle which is effective to enable said truncated conical portion to further aid in splitting the wood when coming into contact therewith, wall means forming a cylindrical base wall having a diameter substantially equal to the larger diameter of said truncated conical portion and affixed thereto, and means for connecting said cylindrical base wall to drive means for rotating said cone.

2. A wood splitter according to claim 1 characterized by said truncated conical portion having an ungrooved, smooth outer surface.

3. A wood splitter according to claim 1 characterized by said connecting means comprising a plurality of bolt openings located around said cylindrical base wall near an inner edge thereof, and said connecting means further comprising a mounting plate having a plurality of bolt openings positioned to be aligned with the bolt openings of said cylindrical base wall and further having means for connecting the mounting plate to a powered wheel hub of a vehicle which constitutes the drive means.

4. A wood splitter according to claim 3 characterized by nuts in alignment with said base wall openings, and said mounting plate having bolts extending through said base wall openings and threaded into said nuts.

5. A wood splitter according to claim 3 characterized by said last-named means comprising a plurality of stud holes in said mounting plate positioned to be aligned with studs of the wheel hub.

6. A wood splitter according to claim 1 characterized by said truncated conical wall means extending into the base of said cone and having a transverse wall perpendicular to the axis of the splitter near the base edge of said cone.

7. A wood splitter assembly to enable one wood splitter to be connected and driven by various wheel hubs of automobiles, said assembly comprising wall means forming a base and wall means forming a cone tapering away from said base, said cone having a groove extending at least a substantial portion of the length thereof, wall means forming a truncated conical portion connecting said cone and said base and tapering away from said base, said truncated conical portion being formed with an included angle which is effective to enable said truncated conical portion to further aid in splitting the wood when coming into contact therewith, said base having connecting means comprising a plurality of bolt openings spaced around said base near an inner edge thereof, a mounting plate having connecting means spaced therearound and positioned to be connected with said connecting means of said base, said mounting plate having a plurality of stud holes located to be aligned with studs of a wheel hub and spaced inwardly from said plate connecting means to enable said mounting flange to be affixed to a wheel hub of at least one automobile, and said mounting plate having a large central opening therein, the periphery of which is spaced inwardly from said stud holes.

8. A wood splitter assembly according to claim 7 characterized by said base being cylindrical, the larger end of said truncated conical portion having a diameter substantially equal to the diameter of said base, and the smaller end of said conical portion being substantially equal to the diameter of the base of said cone.

9. A wood splitter assembly to enable one wood splitter to be connected and driven by various wheel hubs of automobiles, said assembly comprising wall means forming a base and wall means forming a cone tapering away from said base, said cone having a groove extending at least a substantial portion of the length thereof, said base having a mounting flange with a plurality of bolt openings spaced around said flange near an inner edge of said base, a mounting plate having a plurality of bolts integrally affixed thereto and positioned to be aligned with the bolt holes of said mounting flange, said mounting plate having a plurality of stud holes spaced inwardly from said bolts and positioned to be aligned with studs of various wheel hubs of automobiles to enable said mounting plate to be affixed to wheel hubs of automobiles, and said mounting plate further having a large central opening therein, the periphery of which is spaced inwardly from said stud holes.

* * * * *